(12) United States Patent
Madison

(10) Patent No.: US 8,653,687 B2
(45) Date of Patent: Feb. 18, 2014

(54) LIQUEFIED GAS EXPANDER NOZZLE RING HAVING ADJUSTABLE GUIDE VANES

(75) Inventor: Joel V. Madison, Reno, NV (US)

(73) Assignee: Ebara International Corporation, Sparks, NV (US)

( * ) Notice: Subject to any disclaimer, the term of this patent is extended or adjusted under 35 U.S.C. 154(b) by 62 days.

(21) Appl. No.: 13/352,837

(22) Filed: Jan. 18, 2012

(65) Prior Publication Data

US 2012/0248786 A1    Oct. 4, 2012

Related U.S. Application Data

(60) Provisional application No. 61/516,576, filed on Apr. 4, 2011.

(51) Int. Cl.
    *F03B 13/00*  (2006.01)
(52) U.S. Cl.
    USPC .............................................. 290/54; 415/162
(58) Field of Classification Search
    USPC ...................... 290/43, 54; 415/159, 162
    See application file for complete search history.

(56) References Cited

U.S. PATENT DOCUMENTS

| | | | | |
|---|---|---|---|---|
| 2,976,013 A | * | 3/1961 | Hunter | 415/110 |
| 3,657,898 A |   | 4/1972 | Ness et al. | |
| 4,355,953 A | * | 10/1982 | Nelson | 415/164 |
| 4,657,476 A | * | 4/1987 | Berg | 415/48 |
| 6,419,464 B1 | * | 7/2002 | Arnold | 417/407 |
| 6,729,134 B2 | * | 5/2004 | Arnold et al. | 60/602 |
| 7,059,129 B2 | * | 6/2006 | Zollinger et al. | 60/602 |
| 7,922,445 B1 | * | 4/2011 | Pankey et al. | 415/160 |
| 8,235,655 B1 | * | 8/2012 | Pankey et al. | 415/160 |
| 2008/0122226 A1 | * | 5/2008 | Madison | 290/52 |

FOREIGN PATENT DOCUMENTS

| | | |
|---|---|---|
| DE | 3318165 A1 | 11/1984 |
| EP | 037432 A2 | 10/1981 |
| GB | 2077365 A | 12/1981 |

OTHER PUBLICATIONS

"Two-Phase LNG Expanders" Gas Processors Association—GTL and LNG in Europe at Amsterdam on Feb. 24, 25, 2005.*
European Patent Application No. 12151620.7: European Search Report dated Apr. 20, 2012, 7 pages.
Patel, et al. "Fifteen Years of Field Experience in LNG Expander Technology" Proceedings of the First Middle East Turbomachinery Symposium, Feb. 13-16, 2011, Doha, Qatar.
Kimmel et al. "Thermo-Fluid Dynamics and Design of Liquid-Vapour Two-Phase LNG Expanders" Gas Processors Association, Europe, Feb. 2010.

* cited by examiner

*Primary Examiner* — Vanessa Girardi
(74) *Attorney, Agent, or Firm* — Baker & Hostetler LLP

(57) ABSTRACT

The present disclosure provides an improved multistage cryogenic liquefied gas expander for transforming the energy of a pressurized liquefied gas into electric energy, capable of operating at variable speeds, the improvement being a multistage cryogenic liquefied gas expander having at least two stages where only the first stage has a non-rotating nozzle ring having a plurality of adjustable position guide vanes.

4 Claims, 10 Drawing Sheets

LIQUEFIED GAS EXPANDER NOZZLE RING HAVING ADJUSTABLE GUIDE VANES

CROSS-REFERENCES TO RELATED APPLICATIONS

The present application claims priority to U.S. Provisional Patent Application No. 61/516,576, "Cryogenic Liquefied Gas Expander" filed on Apr. 4, 2011, hereby incorporated by reference in its entirety.

BRIEF DESCRIPTION

The present disclosure provides an improved cryogenic pressurized liquefied gas expander for transforming the energy of a pressurized liquefied gas into electric energy, the improvement being a non-rotating nozzle ring having a plurality of adjustable position guide vanes that further enables the expander to operate at variable speeds.

STATEMENTS AS TO THE RIGHTS TO INVENTIONS MADE UNDER FEDERALLY SPONSORED RESEARCH OR DEVELOPMENT

Not applicable.

REFERENCE TO A "SEQUENCE LISTING," A TABLE, OR A COMPUTER PROGRAM LISTING APPENDIX SUBMITTED ON A COMPACT DISK

Not applicable.

BACKGROUND

From the earliest days of gas liquefaction, the thermodynamic process advantage of employing cryogenic liquefied gas expanders in place of throttling valves was very well recognized. However, the available technology was unable to offer reliable cryogenic liquefied gas expanders until the aerospace industry developed materials and designs suitable for the cryogenic environment.

Liquefied natural gas ("LNG") expanders reduce the high pressure of the condensed liquefied gas by converting the static pressure energy of the fluid into electricity and sub-cooling the refrigerated LNG. The Carnot efficiency of the liquefaction process is significantly increased by using LNG expanders, resulting in a very short amortization time of less than six months for the financial investment in LNG expanders.

Modern process plants for the liquefaction of natural gas operate at high pressure to improve the overall efficiency of the cryogenic process. Following the condensation of the refrigerated gas, the pressurized LNG is expanded to a lower pressure suitable for storage and transportation. The expansion process generates some vapor and cools the remaining liquid. The aim of using an expander rather than a Joule-Thomson valve is to increase the amount of liquid and to decrease the amount of vapor at the outlet of the expander. By employing a two-phase expander with draft tube at the exit, an increased amount of liquid is produced in a near-isentropic expansion process. The benefits of this process are well documented, for example "Fifteen Years of Field Experience in LNG Expander Technology" *Proceedings of the First Middle East Turbomachinery Symposium*, Feb. 13-16, 2011, Doha, Qatar; and "Thermo-Fluid Dynamics and Design of Liquid-Vapour Two-Phase LNG Expanders" presented February 2010 at the Gas Processors Association, Europe, both hereby incorporated by reference.

However despite the benefits provided by the two-phase expander, there are unmet needs in the existing technology. For example, performance of prior art expanders is limited to certain flow rates and differential pressures, which can change over time as the fluid and gas from a well is discharged. As the flow rate decreases the efficiency decreases, such that when the flow rate decreases below 50%, the prior art expanders stop producing power and instead begin to consume power.

To address the need to change flow rates and differential pressures, it is known to exchange the nozzle ring that provides an entrance for the pressurized liquefied gas within a pressure containment vessel into a hydraulic assembly contained within the vessel with a different nozzle ring. Such nozzle rings have a plurality of fixed position guide vanes that direct the pressurized liquefied gas into the hydraulic assembly. By changing the position of the guide vanes, it is possible to change the flow rate and differential pressure. To change the position of the guide vanes, however, it is necessary to shut down the expander so as to take the expander apart to remove the existing nozzle ring and install the new one. Shutting down the expander for such purposes impacts production of the well and is costly. The present disclosure provides improvements and benefits to the prior art.

DETAILED DESCRIPTION

The present disclosure provides an improved multistage cryogenic liquefied gas expander having at least two stages for transforming the energy of a pressurized liquefied gas into electric energy having a pressure containment vessel with an inlet flow entrance located at the lower part of the pressure containment vessel and an outlet flow exit located at the upper part of the pressure containment vessel, the pressure containment vessel enclosing a hydraulic assembly, an electric induction generator and a drive shaft, the drive shaft transferring rotational torque energy from the hydraulic assembly to the electric induction generator, and the drive shaft capable of rotating at a constant speed or a variable speed, wherein the hydraulic assembly consists of a hydraulic assembly housing enclosing a nozzle ring that provides an entrance for the pressurized liquefied gas from within the pressure containment vessel into the hydraulic assembly, the nozzle ring having a plurality of fixed position guide vanes that directs the pressurized liquefied gas to a radial inflow turbine runner, the radial inflow turbine runner is affixed to and provides a first portion of the rotational torque energy to the drive shaft, and directs the pressurized liquefied gas to a jet exducer, the jet exducer is affixed to and provides a second portion of the rotational torque energy to the drive shaft and directs a liquefied gas transformed from the pressurized liquefied gas to the outlet flow exit of the pressure containment vessel.

The present improvement comprises: a multistage cryogenic liquefied gas expander capable of operating at variable speeds having at least two stages where only the first stage has a non-rotating nozzle ring having a plurality of adjustable position guide vanes, each adjustable position guide vane having an outer end and an inner end, the outer end having a sliding groove formed therein where the outer end adjoins movably to a rotatable ring base, the inner end rotatably attached to a non-movable base, the outer end of each adjustable position guide vane capable of being repositioned by a guide vane adjustment mechanism, the guide vane adjustment mechanism having a gear screw affixed to the rotatable ring base, a gear screw rod engaged to the gear screw, where rotation of the gear screw rod causes the gear screw to move the rotatable ring base, each pair of the adjustable position guide vanes forming a channel extending from the outer end to the inner end of each pair of adjustable position guide vanes, wherein movement of the rotatable ring base results in the outer end of each adjustable position guide vane to move altering a width of the channel between adjacent inner ends of each pair of adjustable position guide vanes.

Figure 1A:
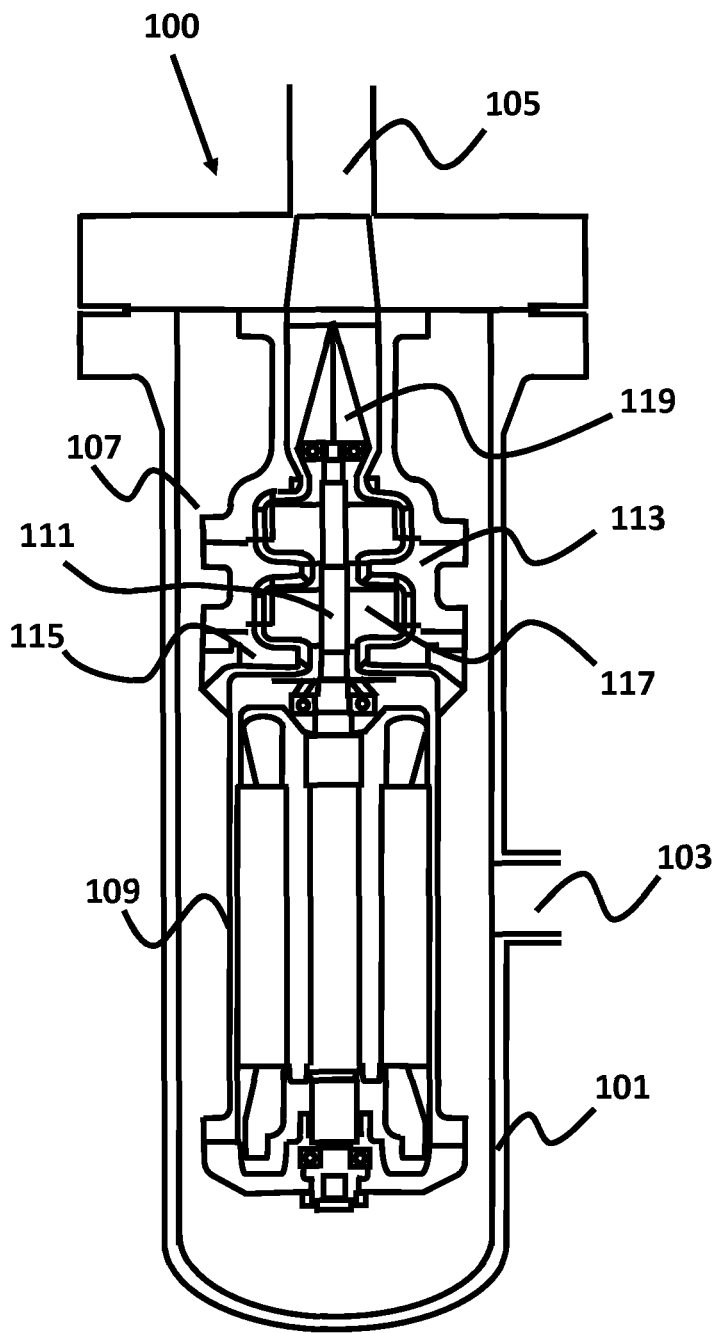
FIG. 1A is a cross-sectional view of an exemplary single stage prior art cryogenic liquefied gas expander.

FIG. 1A depicts a cross sectional view of an exemplary prior art single stage cryogenic liquefied gas expander 100 having a pressure containment vessel 101 with an inlet flow entrance 103 located at the lower part of the pressure containment vessel and an outlet flow exit 105 located at the upper part of the pressure containment vessel. The pressure containment vessel encloses a hydraulic assembly 107, an electric induction generator 109 and a drive shaft 111. The drive shaft transfers rotational torque energy from the hydraulic assembly 107 to the electric induction generator 109. The hydraulic assembly 107 consists of a hydraulic assembly housing 113 enclosing a non-rotating nozzle ring 115 that provides an entrance for the pressurized liquefied gas into the hydraulic assembly. The nozzle ring 115 has a plurality of fixed position guide vanes that directs the pressurized liquefied gas to a radial inflow turbine runner 117. The radial inflow turbine runner 117 is affixed to and provides a first portion of the rotational torque energy to the drive shaft 111, and directs the pressurized liquefied gas to a jet exducer 119. The jet exducer 119 is affixed to the drive shaft 111. The jet exducer 119 provides a second portion of the rotational torque energy to the drive shaft 111 and directs a liquefied gas transformed from the pressurized liquefied gas to the outlet flow exit 105 of the pressure containment vessel 101.

Figure 1B:
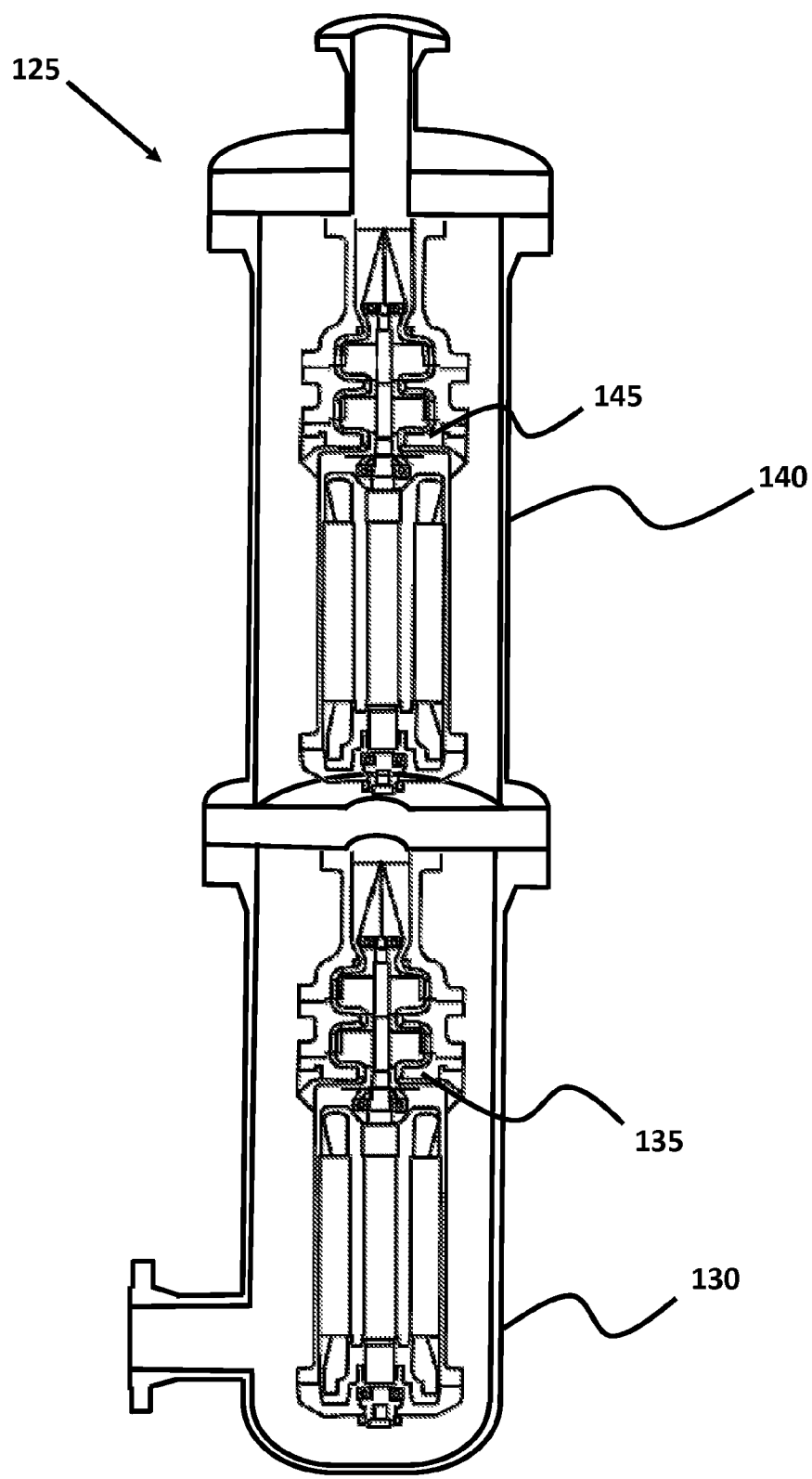
FIG. 1B is a cross-sectional view of an exemplary two stage prior art cryogenic liquefied gas expander.

FIG. 1B provides a cross sectional view of an exemplary prior art multistage cryogenic liquefied gas expander having two stages 125 where the first stage 130 has a nozzle ring 135, and the second stage 140 having a nozzle ring 145, where nozzle rings 135 and 145 each have a plurality of fixed position guide vanes.

Figure 1C:
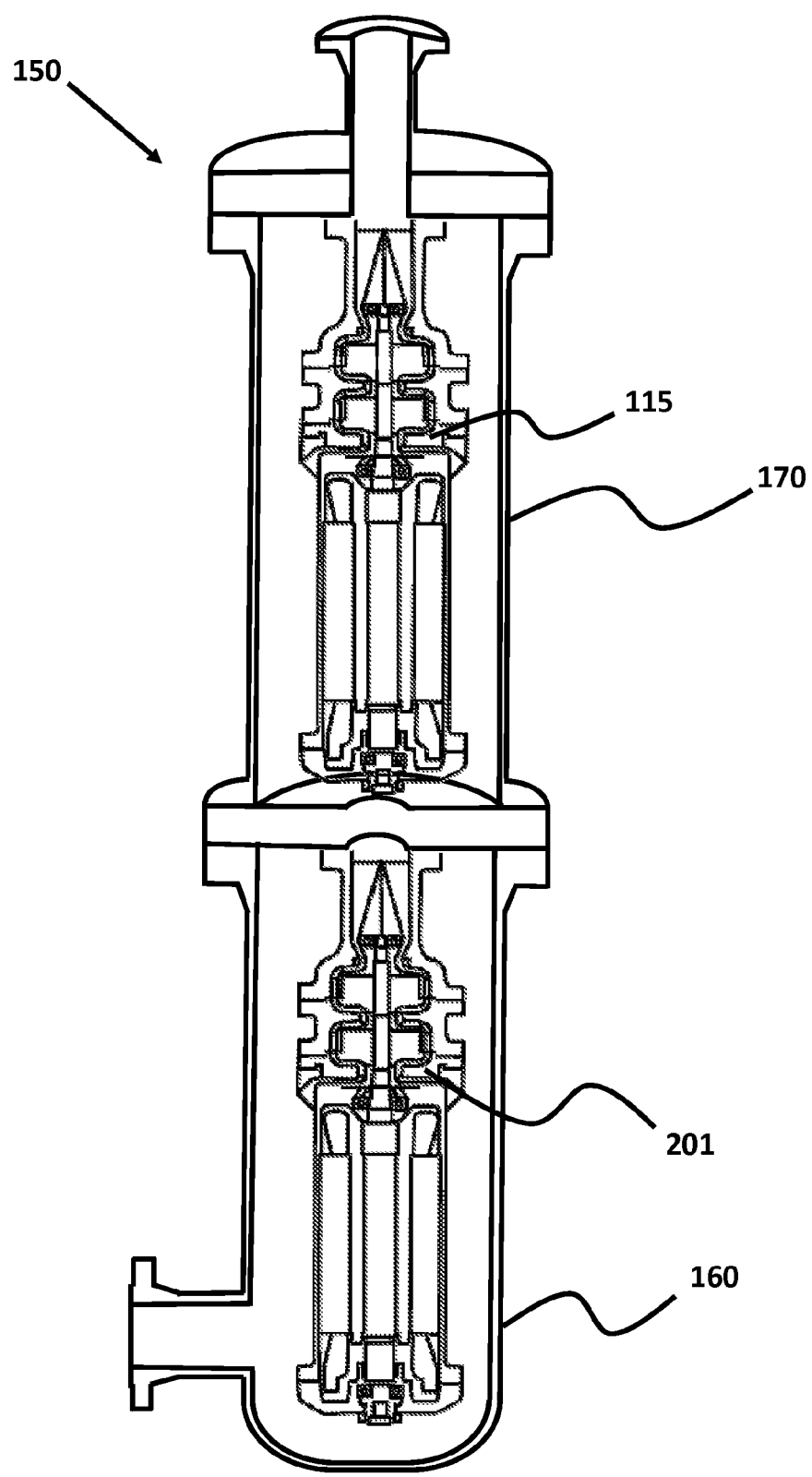
FIG. 1C is a cross-sectional view of a two stage cryogenic liquefied gas expander having the improved aspect of the present disclosure, a non-rotating nozzle ring.
Figure 3A:
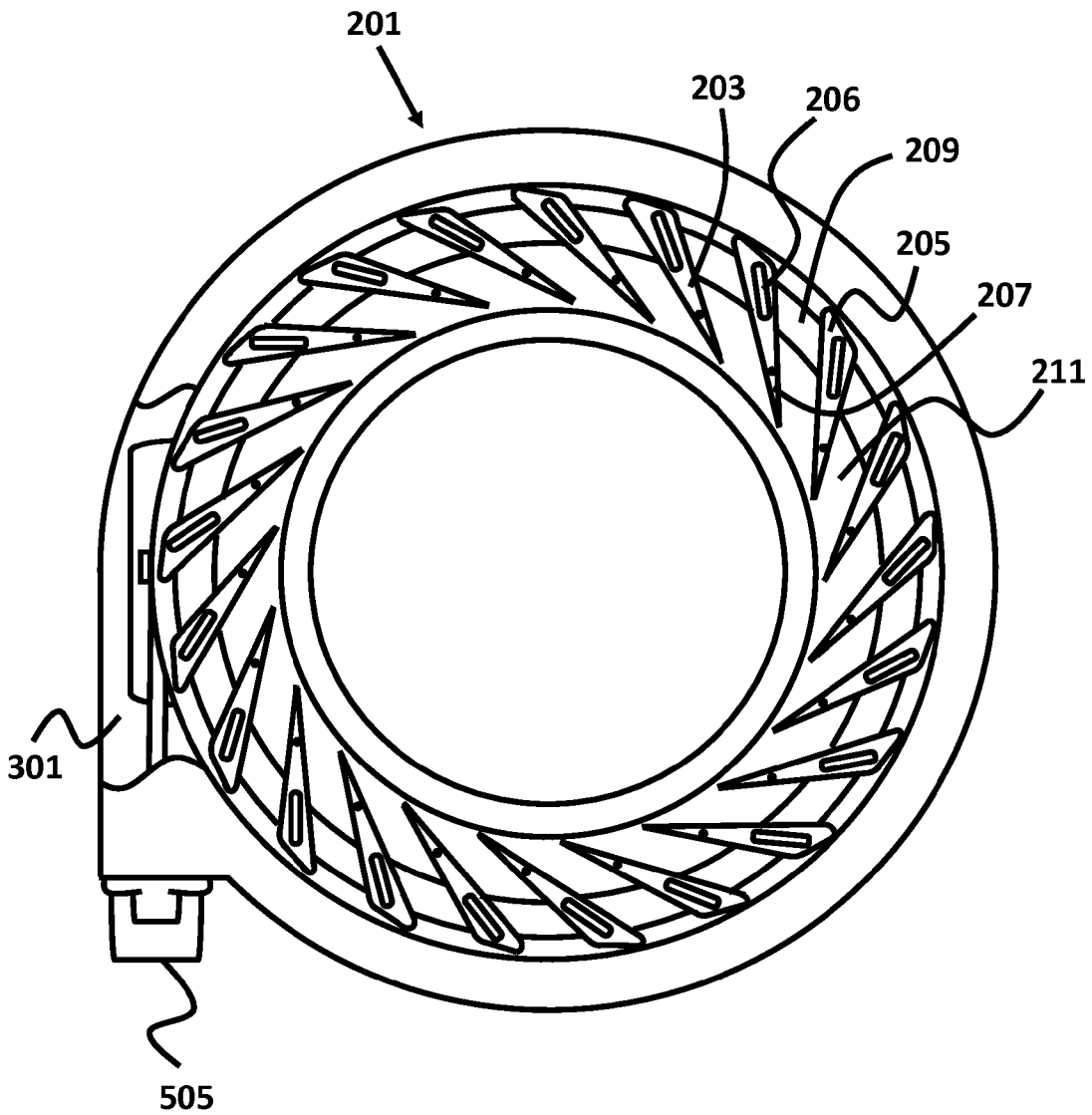
FIG. 3A is a plan view of the non-rotating nozzle ring.

FIG. 1C provides a cross sectional view of one embodiment of one aspect of the improved aspect of the present disclosure, a two stage cryogenic liquefied gas expander 150 where the first stage 160 has a non-rotating nozzle ring 201, as further illustrated in FIG. 3A, having a plurality of adjustable position guide vanes 203, and the second stage 170 having a nozzle ring 115 having a plurality of fixed position guide vanes.

Figure 2:
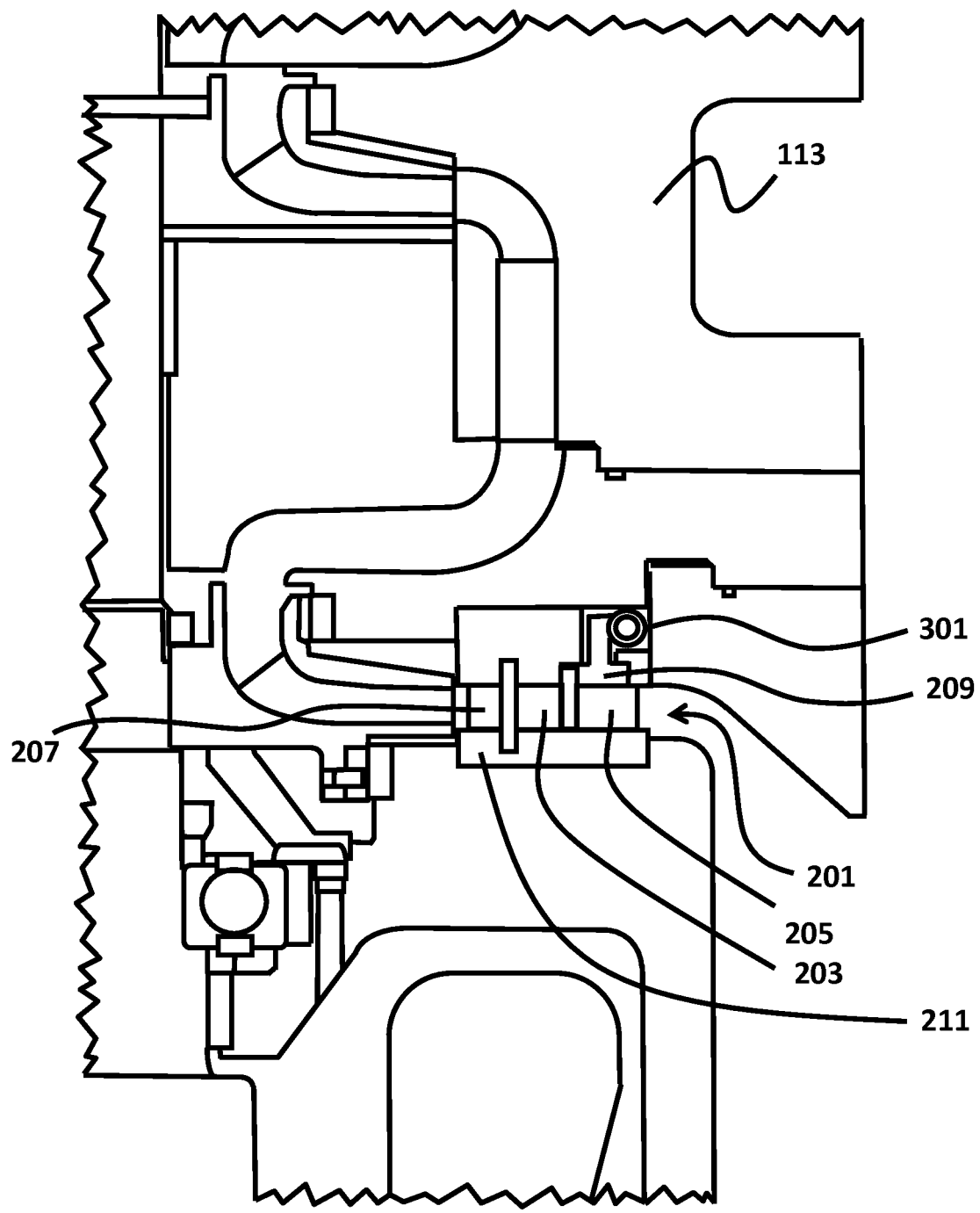
FIG. 2 is a partially-broken, cross-sectional view of the improved aspect of the present disclosure, a non-rotating nozzle ring.

FIG. 2 provides a cross sectional view of one aspect of the improved aspect of the present disclosure, the non-rotating nozzle ring 201. The hydraulic assembly housing 113 encloses the nozzle ring 201, which has a plurality of adjustable position guide vanes 203, where each adjustable position guide vane has an outer end 205 and an inner end 207. The outer end 205 adjoins movably to a rotatable ring base 209. The inner end 207 is pivotally adjoined to a non-movable base 211. The outer end 205 of each adjustable position guide vane is capable of being repositioned by a guide vane adjustment mechanism 301, while each inner end 207 pivots around a fixed position so as to accommodate the changed position of each outer end 205, as further explained with reference to FIG. 3B.

FIG. 3A provides a plan view of the non-rotating nozzle ring 201 having a plurality of adjustable position guide vanes 203. Each adjustable position guide vane having an outer end 205 and an inner end 207. The outer end 205 has a sliding groove 206 formed therein where the outer end 205 adjoins movably to a rotatable ring base 209, as further explained with reference to FIG. 3B. The inner end 207 is pivotally attached to a non-movable base 211, as further explained with reference to FIG. 3B. The outer end 205 of each adjustable position guide vane 203 is capable of being repositioned by a guide vane adjustment mechanism 301, as further explained with reference to FIG. 4.

Figure 3B:
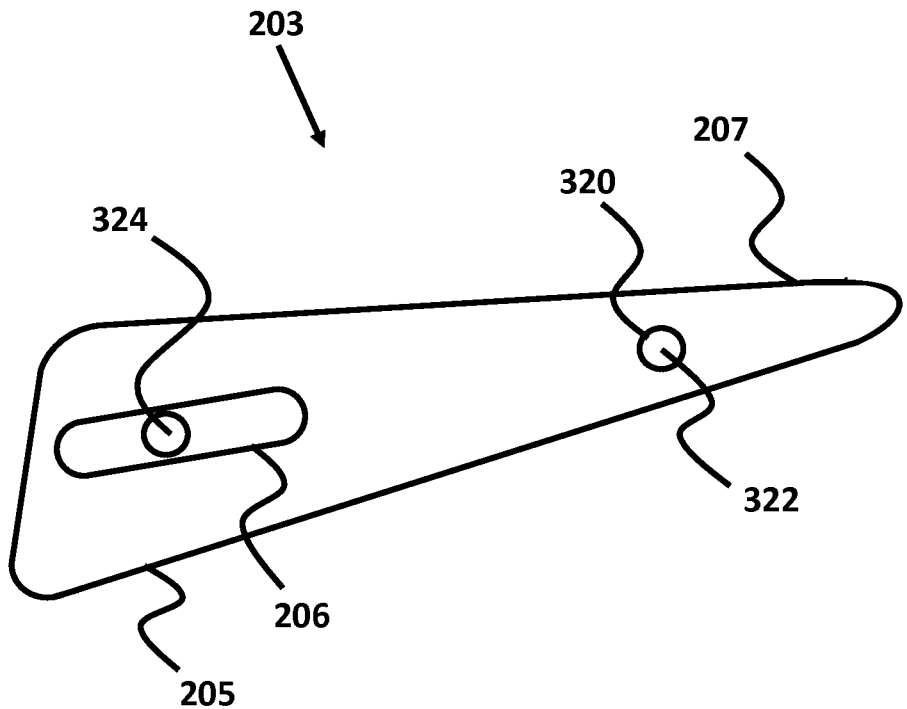
FIG. 3B is a plan view of a single guide vane of the non-rotating nozzle ring.

FIG. 3B provides a plan view of a single guide vane 203 having outer end 205, inner end 207 and sliding groove 206. A first pin 324 is fixedly attached to and extends from the rotatable ring base 209, shown in FIG. 3A. A pivot hole 320 formed in inner end 207 is placed over a second pin 322, a pivot pin, which is fixedly attached to and extends from the non-movable base 211, also shown in FIG. 3A. The guide vane 203 is placed over the first pin 324 and second pin 322 so that the guide vane 203 is movably held in place by the pins as the rotatable ring base 209 is moved relative to the non-movable base 211. The pivot hole 320 of inner end 207 pivots about the second pin 322 as the first pin 324 slides radially along the sliding groove 206 of the outer end 205.

Figure 4:
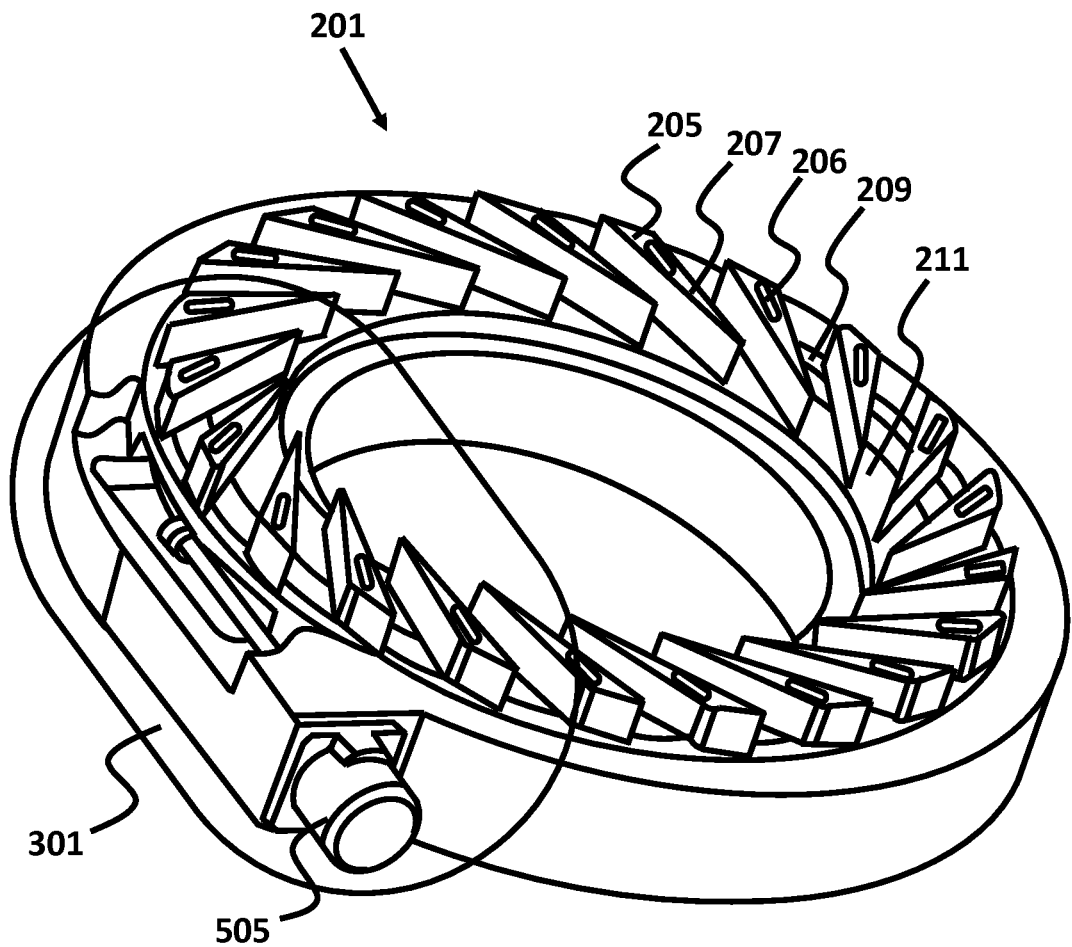
FIG. 4 is a perspective view of the non-rotating nozzle ring and the guide vane adjustment mechanism.
Figure 5:
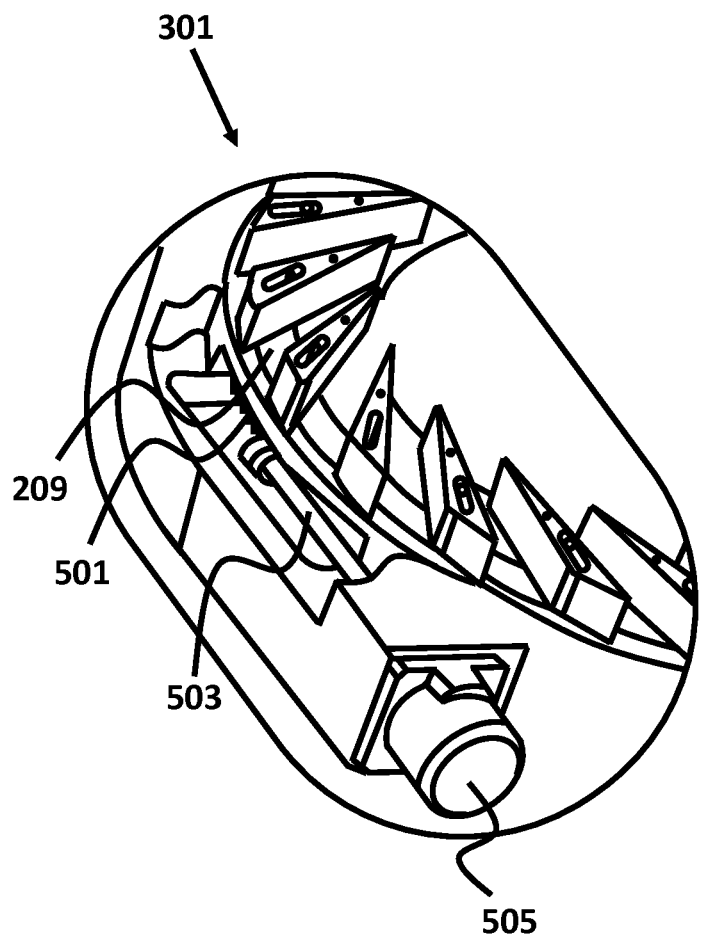
FIG. 5 is an enlarged perspective view of the guide vane adjustment mechanism.

FIGS. 4 and 5 provide a perspective view of the non-rotating nozzle ring 201 and the guide vane adjustment mechanism 301. FIG. 4 shows each adjustable position guide vane having an outer end 205 and an inner end 207. The outer end 205 has a sliding groove 206 formed therein where the outer end adjoins movably to a rotatable ring base 209. The inner end 207 is pivotally adjoined to a non-movable base 211. The outer end 205 of each adjustable position guide vane 203 is capable of being repositioned by a guide vane adjustment mechanism 301. FIG. 5 provides an enlarged perspective view of the guide vane adjustment mechanism 301 from FIG. 4. The guide vane adjustment mechanism 301 having a gear screw 501 formed from or affixed to the rotatable ring base 209, a gear screw rod 503 engaged to the gear screw and a handle 505, where rotation of the handle 505 rotates the gear screw rod 503, thereby causing the gear screw 501 to move the rotatable ring base 209. The handle 505, as illustrated in FIGS. 3-7, is configured so as to be accessible from the outside of the containment vessel 101 so that guide vanes 203 can be adjusted while the expander is in use, which allows the flow rates and differential pressures to be fine-tuned.

Figure 6:
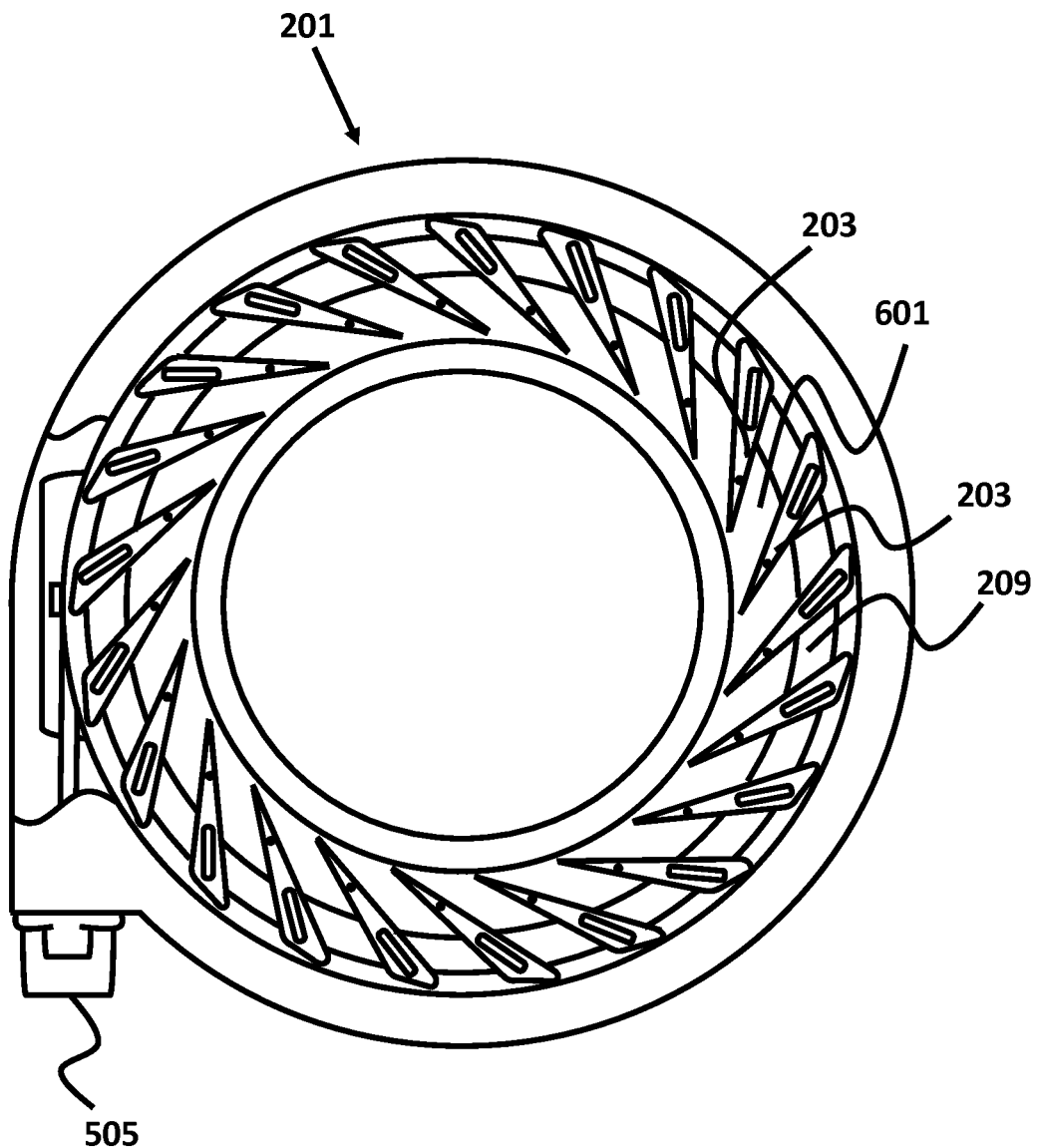
FIG. 6 is a plan view of the non-rotating nozzle ring depicting the adjustable position guide vanes adjusted to provide a first channel width.

FIG. 6 provides a plan view of the non-rotating nozzle ring 201. Each pair of the adjustable position guide vanes 203 forms a channel 601 extending from the outer end to the inner end of each pair of adjustable position guide vanes 203. The movement of the rotatable ring base 209 results in the outer end of each adjustable position guide vane 203 to move altering a width of the channel between adjacent inner ends of each pair of adjustable position guide vanes 203.

Figure 7:
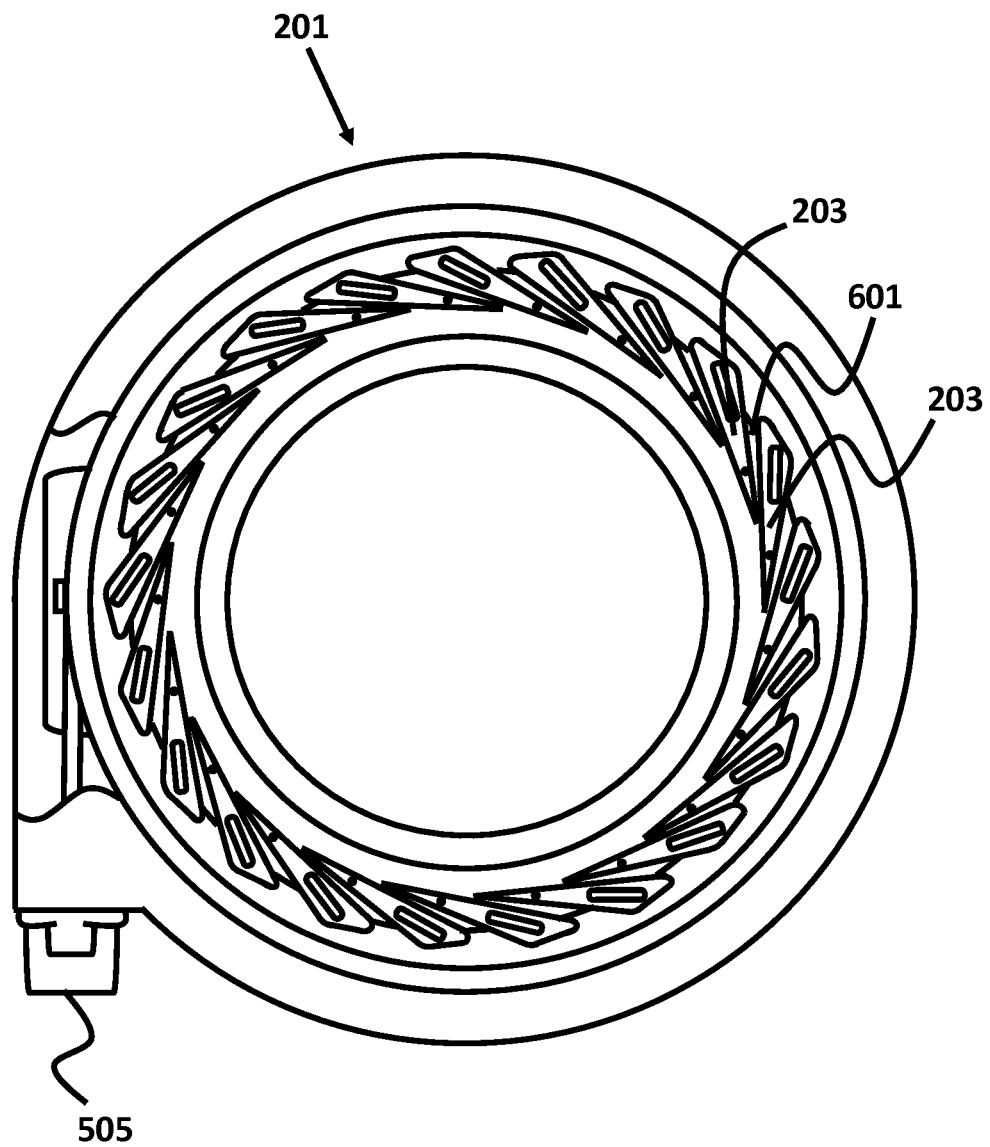
FIG. 7 is a plan view of the non-rotating nozzle ring depicting the adjustable position guide vanes adjusted to provide a second channel width.

FIG. 7 provides a plan view of the non-rotating nozzle ring 201 having an alternate configuration for the adjustable position guide vanes 203. FIG. 6 shows the adjustable position guide vanes 203 adjusted to provide a channel 601 to provide a first channel width. FIG. 7 shows the adjustable position guide vanes 203 adjusted to provide a channel 601 to provide a second channel width. In the present depiction, the second channel is narrower than the first channel. However, it should be duly noted that the channel widths depicted in FIG. 6 and FIG. 7 illustrate only two of a plurality of possible channel widths provided by the non-rotating nozzle ring 201. Any desired channel width can be readily obtained by rotating the handle 505 of the gear screw rod 503 causing the gear screw 501 to move the rotatable ring base 209 to position the adjustable position guide vanes 203 to provide a desired channel width.

A benefit provided by the adjustable position guide vanes is that the guide vanes can be repositioned to alternate positions without having to take apart the expander to replace an existing nozzle ring with vanes in one orientation with an another nozzle ring having vanes in an alternate orientation.

Prior art multistage cryogenic liquefied gas expanders having multiple stages and adjustable nozzle rings require a corresponding number of feed through shafts to access and adjust each nozzle ring. The additional feed through shafts result in leakage between stages, and they also conduct heat from the outside into the expander, thereby heating up the cryogenic fluid.

A benefit provided by the present improved multistage cryogenic liquefied gas expander is that only the first stage of the multistage expander has a non-rotating nozzle ring with adjustable position guide vanes. This improvement eliminates the disadvantage caused by having multiple feed through shafts, which is made necessary by having adjustable nozzle rings at each stage. As such, there is efficiency gained by having only one stage with a non-rotating nozzle ring with adjustable position guide vanes. The present improved expander can operate with just a single stage having a non-rotating nozzle ring with adjustable position guide vanes because it can operate at variable speeds. The present improvement is also distinguishable from so-called "gas expanders" which can transform energy of pressurized gas, which is a gas, but which cannot transform energy of liquefied gas. Such gas expanders typically operate at speeds of between 8,000 to 10,000 RPM. The present improvement, which can transform energy of pressurized liquefied gas, which is a liquid, typically operates at speeds of between 3,000 to 3,600 RPM.

While the present disclosure has been illustrated and described herein in terms of a preferred embodiment and several alternatives, it is to be understood that the techniques described herein can have a multitude of additional uses and applications. Accordingly, the invention should not be limited to just the particular description and various drawing figures contained in this specification that merely illustrate a preferred embodiment and application of the principles of the invention.

What is claimed is:

1. A multistage cryogenic liquefied gas expander having at least two stages for transforming the energy of a pressurized liquefied gas into electric energy each stage having a pressure containment vessel with an inlet flow entrance located at a lower part of the pressure containment vessel and an outlet flow exit located at an upper part of the pressure containment vessel, the pressure containment vessel enclosing a hydraulic assembly, an electric induction generator and a drive shaft, the drive shaft transferring rotational torque energy from the hydraulic assembly to the electric induction generator, and the drive shaft capable of rotating at a constant speed or a variable speed, wherein the hydraulic assembly consists of a hydraulic assembly housing enclosing a nozzle ring that provides an entrance for the pressurized liquefied gas from within the pressure containment vessel into the hydraulic assembly, the nozzle ring having a plurality of fixed position guide vanes that directs the pressurized liquefied gas to a radial inflow turbine runner, the radial inflow turbine runner is affixed to and provides a first portion of the rotational torque energy to the drive shaft, and directs the pressurized liquefied gas to a jet exducer, the jet exducer is affixed to and provides a second portion of the rotational torque energy to the drive shaft and directs a liquefied gas transformed from the pressurized liquefied gas to the outlet flow exit of the pressure containment vessel, wherein the improvement comprises:

a multistage cryogenic liquefied gas expander capable of operating at variable speeds having at least two stages where only a first stage has a non-rotating nozzle ring having a plurality of adjustable position guide vanes, each adjustable position guide vane having an outer end, an inner end and a first length from the outer end to the inner end, and within the outer end a sliding groove having a second length axial with and shorter than the first length within which a pin, from a rotatable ring base, travels the second length of the groove movably adjoining the outer end of the guide vane to the rotatable ring base, and the inner end of each guide vane is pivotally adjoined to a non-movable base, the outer end of each adjustable position guide vane capable of being repositioned by a guide vane adjustment mechanism, the guide vane adjustment mechanism having a gear screw affixed to the rotatable ring base, a gear screw rod engaged to the gear screw, and a handle engaged to the gear screw rod, where rotation of the handle causes the gear screw to move the rotatable ring base, each pair of the adjustable position guide vanes forming a channel extending from the outer end to the inner end of each pair of adjustable position guide vanes, wherein movement of the rotatable ring base results in the outer end of each adjustable position guide vane to move altering a width of the channel between adjacent inner ends of each pair of adjustable position guide vanes.

2. The multistage cryogenic liquefied gas expander of claim 1, wherein the handle is accessible from outside of the pressure containment vessel.

3. The multistage cryogenic liquefied gas expander of claim 1, the improvement further comprising a plurality of first pins affixed to the rotatable ring base and positioned within the sliding groove of each adjustable position guide vane.

4. The multistage cryogenic liquefied gas expander of claim 3, the improvement further comprising a second pin affixed to the non-movable base and positioned within a pivot hole formed within the inner end of each adjustable position guide vane.

* * * * *